(12) United States Patent
Lee

(10) Patent No.: US 8,284,367 B2
(45) Date of Patent: Oct. 9, 2012

(54) LIQUID CRYSTAL DISPLAY DEVICE

(75) Inventor: Min-Jic Lee, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 120 days.

(21) Appl. No.: 12/967,723

(22) Filed: Dec. 14, 2010

(65) Prior Publication Data

US 2012/0033169 A1    Feb. 9, 2012

(30) Foreign Application Priority Data

Aug. 3, 2010    (KR) .................... 10-2010-0075107

(51) Int. Cl.
   *G02F 1/1343*    (2006.01)
   *G02F 1/1368*    (2006.01)
   *G02F 1/139*    (2006.01)
(52) U.S. Cl. ..................... 349/141; 349/38; 349/110
(58) Field of Classification Search ............. 349/38, 349/39, 42, 110, 111, 141; 257/59, 72; 345/92
   See application file for complete search history.

(56) References Cited

U.S. PATENT DOCUMENTS

| | | | |
|---|---|---|---|
| 2004/0252266 A1* | 12/2004 | Shimizu et al. | 349/139 |
| 2006/0227276 A1* | 10/2006 | Son | 349/141 |
| 2006/0256249 A1* | 11/2006 | Nagano et al. | 349/43 |
| 2008/0068516 A1* | 3/2008 | Mori et al. | 348/790 |

* cited by examiner

*Primary Examiner* — Dung Nguyen
*Assistant Examiner* — Tai Duong
(74) *Attorney, Agent, or Firm* — McKenna Long & Aldridge, LLP

(57) ABSTRACT

A liquid crystal display device includes: first gate lines and second gate lines alternately formed in a first direction; data lines intersect the first gate lines and the second gate lines; common lines; shield lines extending from the common lines such that the shield lines are disposed adjacent to opposite sides of the data lines in parallel; first transistors formed at regions where the first gate lines and the data lines intersect; first pixel electrodes formed at pixel regions of first pixels defined by intersection between the first gate lines and the data lines, the first pixel electrodes at least partially overlapping with the common lines and the shield lines respectively around the pixel regions of the first pixels; and first common electrodes formed alternately with the first pixel electrodes at the pixel regions of the first pixels.

7 Claims, 6 Drawing Sheets

LIQUID CRYSTAL DISPLAY DEVICE

This application claims the benefit of Korean Patent Application No. 10-2010-0075107, filed on Aug. 3, 2010, which is hereby incorporated by reference as if fully set forth herein.

BACKGROUND OF THE INVENTION

1. Field of the Invention

The present invention relates to a liquid crystal display device, and more particularly, to a liquid crystal display device having a double reduced data (DRD) pixel structure wherein reduction of an aperture ratio is minimized, thereby improving image quality.

2. Discussion of the Related Art

In recent years, displays to visually express an electric information signal have been rapidly developed. As a result, various kinds of small and lightweight flat display devices having low power consumption have been developed and rapidly replaced conventional cathode ray tubes (CRTs).

Examples of the flat display devices include a liquid crystal display (LCD), an organic light emitting display (OLED), an electrophoretic display or electric paper display (EPD), a plasma display panel (PDP), a field emission display (FED), an electroluminescent display (ELD), and an electrowetting display (EWD). These displays commonly require a flat display panel on which an image is displayed. The flat display panel includes a pair of substrates coupled to each other while an inherent luminous material or polarizing material layer is disposed therebetween. The LCD is a typical example of a flat display device. The LCD adjusts light transmissivity of a liquid crystal using an electric field to display an image.

A general liquid crystal display device includes a lower substrate and an upper substrate disposed opposite to each other, a liquid crystal layer filling a space defined between the lower substrate and the upper substrate, a transistor array at the top of the lower substrate to define a plurality of pixel regions corresponding to a plurality of pixels and to control light transmissivity of the liquid crystal layer corresponding to the respective pixel regions, pixel electrodes and common electrodes alternately formed on the pixel regions, black matrices formed at the rear of the upper substrate to prevent light leakage around the pixel regions, and gate driver integrated circuits (hereinafter, referred to as "gate D-ICs") to apply a gate signal to the transistor array and data driver integrated circuits (hereinafter, referred to as "data D-ICs") to apply a data signal to the transistor array. The transistor array includes gate lines and data lines intersecting to define the respective pixel regions and a plurality of transistors disposed at regions where the gate lines and the data lines intersect. The transistors are connected to the pixel electrodes respectively.

In the liquid crystal display device with the above-stated construction, the transistors corresponding to the respective pixels are selectively turned on in response to the gate signal, and pixel voltage corresponding to the data signal is applied to the pixel electrode connected to the turned-on transistor to generate a predetermined electric field between the pixel electrode and the common electrode. The direction of liquid crystal cells is changed according to the generated electric field, thereby adjusting light transmissivity of the respective pixels, i.e., brightness, and thus the liquid crystal display device displays an image.

Meanwhile, the gate D-ICs generate a gate signal to sequentially turn on the transistors. The gate D-ICs may be embodied using relatively simple circuits. On the other hand, the data D-ICs connected to the data lines must generate a data signal corresponding to the respective pixels. For this reason, the data D-ICs are embodied using more complicated circuits than the gate D-ICs. There has been proposed a liquid crystal display device having a double reduced data (DRD) pixel structure in which two neighboring pixels share a data line disposed therebetween, and therefore, the number of the data D-ICs, which are more expensive than the gate D-ICs, is cut in half, thereby reducing manufacturing costs.

FIG. 1 is an equivalent circuit diagram of a general liquid crystal display device having a DRD pixel structure. FIG. 2A is a plan view illustrating a conventional liquid crystal display device having a DRD pixel structure, and FIG. 2B is an image illustrating a light discharge surface of the liquid crystal display device shown in FIG. 2A.

As shown in FIG. 1, pixels P1 and P2 disposed in two neighboring columns are commonly connected to a data line DL disposed between the two neighboring columns. The first pixels P1 commonly connected to the data line DL are connected to a first gate line GL1, and the second pixels P2 commonly connected to the data line DL are connected to a second gate line GL2.

Specifically, as shown in FIG. 2A, a conventional liquid crystal display device having a DRD pixel structure includes first gate lines GL1 and second gate lines GL2 alternately disposed in the horizontal direction, data lines DL and common lines CL alternately disposed in the vertical direction, transistors TFT1 of first pixels P1 disposed at regions where the first gate lines GL1 and the data lines DL intersect, transistors TFT2 of second pixels P2 disposed at regions where the second gate lines GL2 and the data lines DL intersect, pixel electrodes PX and common electrodes CX alternately formed at respective pixel regions defined by the first gate lines GL1 or the second gate lines GL2 and the data lines DL, shield lines SL extending from the common lines CL such that the shield lines SL are disposed at opposite sides of the data lines DL in parallel, and storage capacitors Cst formed by at least partial overlap between horizontal regions of the pixel electrodes PX and lower electrodes extending from the common lines CL at the pixel regions. In the first pixels P1 or the second pixels P2, the pixel electrodes PX are connected to the first transistors TFT1 or the second transistors TFT2 via pixel electrode contact holes CTpx, and the common electrodes CX are connected to the common lines CL via common electrode contact holes CTcx. The storage capacitors Cst are connected in parallel between the common electrodes CX and the pixel electrodes PX such that voltage difference between the common electrodes CX and the pixel electrodes PX is maintained for a predetermined time even after the transistors TFT are turned off. The shield lines SL prevent liquid crystal cells from malfunctioning due to electric potential of the data lines DL to which a data signal is applied.

In the related art, however, the storage capacitors Cst partially occupy the pixel regions, with the result that an aperture ratio is reduced in proportion to the size of the pixel regions occupied by the storage capacitors Cst.

Since the data lines DL and the shield lines SL are adjacent to each other, a predetermined electric field may be generated between the data lines DL to which the data signal is applied and the shield lines SL to which common voltage is applied. Directions of liquid crystal cells disposed around the pixel regions may be changed due to the electric field between the data lines DL and the shield lines SL, thereby occurring the light leakage. In order to prevent light leakage around the pixel regions due to the electric field between the data lines DL and the shield lines SL, black matrices above the data lines DL may be formed to have a width (hereinafter, referred to as a "first width") sufficient to cover the data lines DL and the shield lines SL. On the other hand, the common lines disposed alternately with the data lines DL do not generate an electric field together with other adjacent components, with the result that black matrices above the common lines CL may be formed to have a small width (hereinafter, referred to as a "second width") similar to the common lines CL, irrespective of light leakage around the pixel regions.

If the difference between the first width and the second width is equal to or greater than a critical value, however, the black matrices BM(DL) above the data lines are more visible than the black matrices BM(CL) above the common lines, as shown in FIG. 2B. Such a visibility problem disturbs clear distinction between neighboring pixels between which the corresponding common lines CL are disposed, with the result that image quality is reduced.

In order to prevent reduction of image quality due to the visibility problem, therefore, the black matrices above the common lines CL must be formed to have a width similar to the first width. If the width of the black matrices above the common lines CL is increased, however, an aperture ratio (an area ratio of a light discharge region to a display region) is reduced unnecessarily.

SUMMARY OF THE INVENTION

Accordingly, the present invention is directed to a liquid crystal display device that substantially obviates one or more problems due to limitations and disadvantages of the related art.

An object of the present invention is to provide a liquid crystal display device having a double reduced data (DRD) pixel structure wherein reduction of an aperture ratio is minimized, thereby improving image quality.

Another object of the present invention is to prevent a visibility problem in which the black matrices above the data lines are more visible than the black matrices above the common lines.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device comprises a lower substrate, an upper substrate disposed opposite to the lower substrate, and a liquid crystal layer filling a space defined between the lower substrate and the upper substrate, wherein said lower substrate includes: first gate lines and second gate lines alternately formed in a first direction such that the first gate lines and the second gate lines are insulated from each other; data lines formed in a second direction perpendicular to the first direction such that the data lines intersect the first gate lines and the second gate lines; common lines formed alternately with the data lines in the second direction; shield lines extending from the common lines such that the shield lines are disposed adjacent to opposite sides of the data lines in parallel; first transistors formed at regions where the first gate lines and the data lines intersect; first pixel electrodes formed at pixel regions of first pixels defined by intersection between the first gate lines and the data lines, the first pixel electrodes being connected to the first transistors, the first pixel electrodes at least partially overlapping with the common lines and the shield lines respectively in the second direction around the pixel regions of the first pixels; and first common electrodes formed alternately with the first pixel electrodes at the pixel regions of the first pixels, the first common electrodes being connected to the common lines.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 3A:
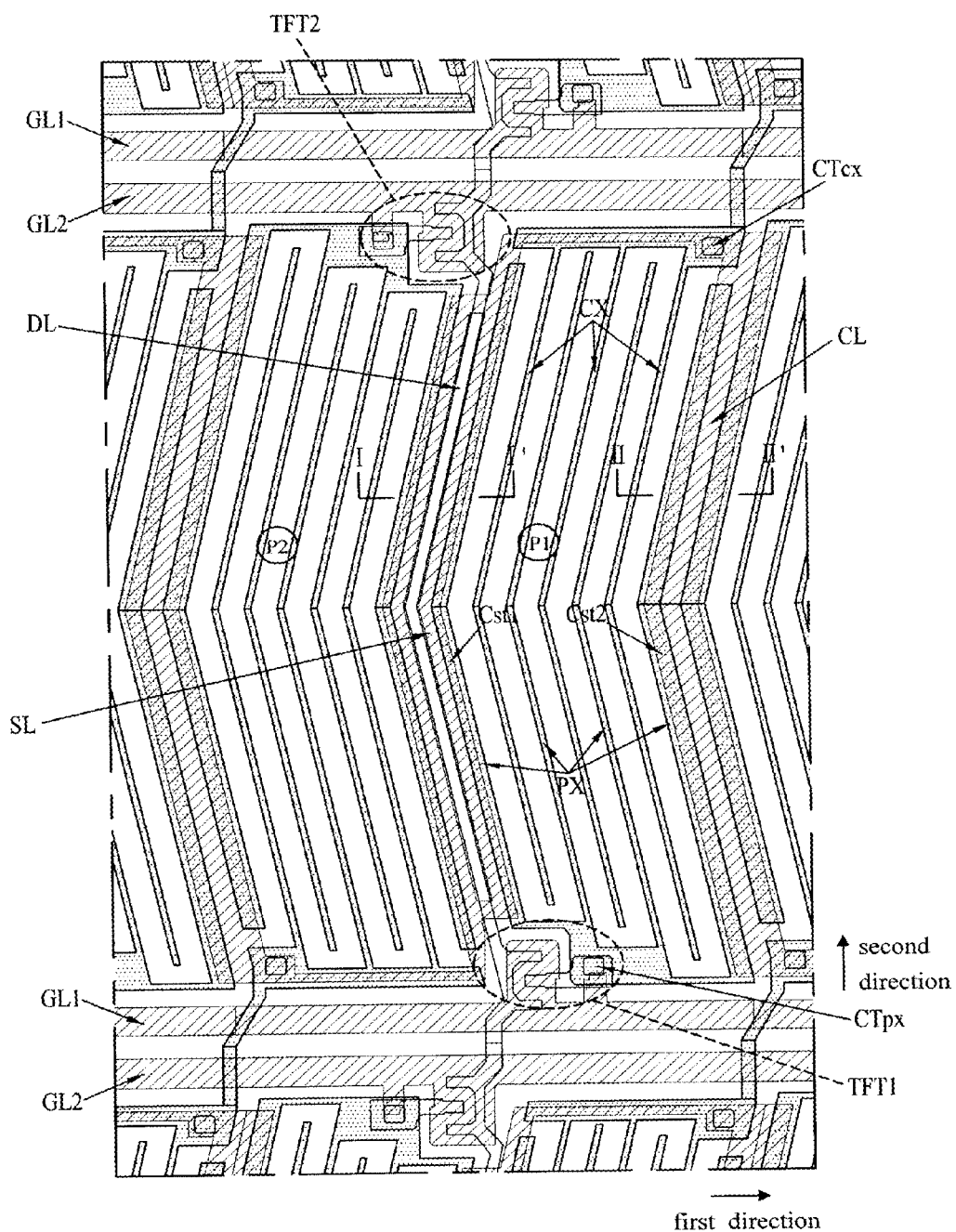
FIG. 3A is a plan view illustrating a liquid crystal display device according to an embodiment of the present invention.
Figure 3B:
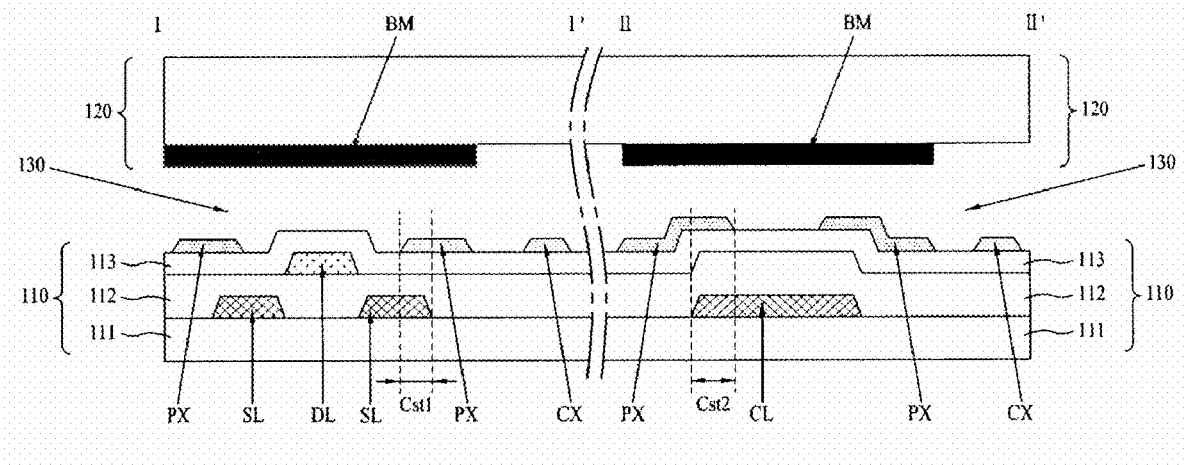
FIG. 3B is a sectional view taken along line I-I' and line II-II' of FIG. 3A.
Figure 4A:
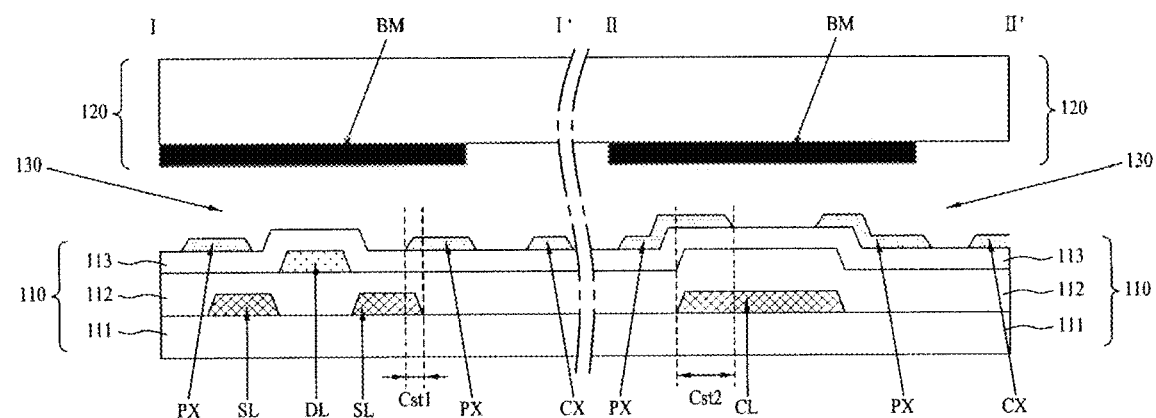
FIG. 4A is a sectional view illustrating change of storage capacitors of the liquid crystal display device shown in FIG. 3B in a case in which a mask is shifted to one side.
Figure 4B:
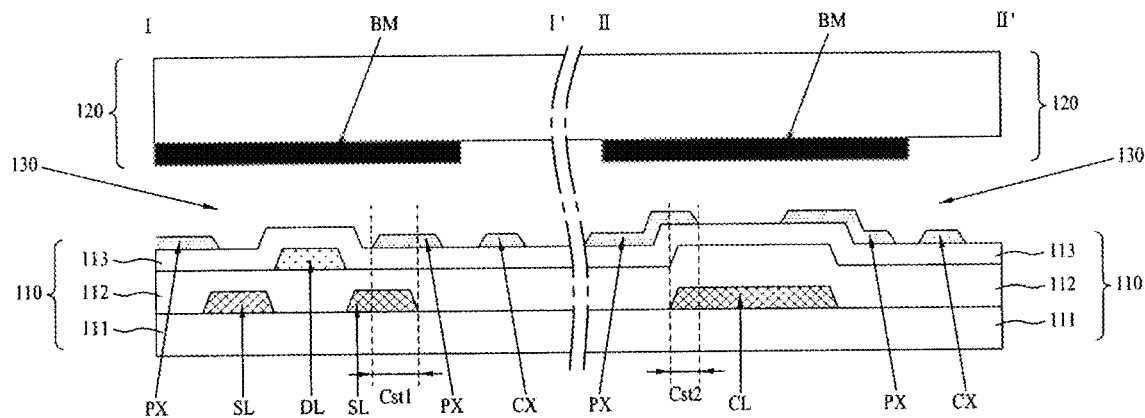
FIG. 4B is a sectional view illustrating change of the storage capacitors of the liquid crystal display device shown in FIG. 3B in a case in which the mask is shifted to the other side.

FIG. 3A is a plan view illustrating a liquid crystal display device according to an embodiment of the present invention, and FIG. 3B is a sectional view taken along line I-I' and line II-II' of FIG. 3A. FIG. 4A is a sectional view illustrating change of storage capacitors of the liquid crystal display device shown in FIG. 3B in a case in which a mask is shifted to one side, and FIG. 4B is a sectional view illustrating change of the storage capacitors of the liquid crystal display device shown in FIG. 3B in a case in which the mask is shifted to the other side.

As shown in FIG. 3A, a liquid crystal display device according to an embodiment of the present invention includes first gate lines GL1 and second gate lines GL2 alternately formed in a first direction (the horizontal direction in FIG. 3A) such that the first gate lines GL1 and the second gate lines GL2 are insulated from each other, data lines DL formed in a second direction (the vertical direction in FIG. 3A) perpendicular to the first direction such that the data lines DL intersect the first gate lines GL1 and the second gate lines GL2, common lines CL formed alternately with the data lines DL in the second direction, shield lines SL extending from the common lines CL such that the shield lines SL are disposed adjacent to opposite sides of the data lines DL in parallel, first transistors TFT1 formed at regions where the first gate lines GL1 and the data lines DL intersect, first pixel electrodes PX formed at pixel regions of first pixels P1 defined by intersection between the first gate lines GL1 and the data lines DL, the first pixel electrodes PX being connected to the first transistors TFT1, the first pixel electrodes PX at least partially overlapping with the common lines CL and the shield lines SL around the pixel regions of the first pixels P1 in the second direction, first common electrodes CX formed alternately with the first pixel electrodes PX at the pixel regions of the first pixels P1, the first common electrodes CX being connected to the common lines CL, first storage capacitors Cst1 formed at regions where the shield lines SL and the first pixel electrodes PX overlap, second storage capacitors Cst2 formed at regions where the common lines CL and the first pixel electrodes PX overlap, second transistors TFT2 formed at regions where the second gate lines GL2 and the data lines DL intersect, second pixel electrodes PX formed at pixel regions of second pixels P2 defined by intersection between the second gate lines GL2 and the data lines DL, the second pixel electrodes PX being connected to the second transistors TFT2, the second pixel electrodes PX at least partially overlapping with the common lines CL and the shield lines SL around the pixel regions of the second pixels P2 in the second direction, second common electrodes CX formed alternately with the second pixel electrodes PX at the pixel regions of the second pixels P2, the second common electrodes CX being connected to the common lines CL, third storage capacitors (not shown) formed at regions where the shield lines SL and the second pixel electrodes PX overlap, and fourth storage capacitors (not shown) formed at regions where the common lines CL and the second pixel electrodes PX overlap.

As shown in FIG. 3B, the liquid crystal display device includes a lower substrate 110, an upper substrate 120 disposed opposite to the lower substrate 110, and a liquid crystal layer 130 filling a space defined between the lower substrate 110 and the upper substrate 120.

Specifically, the lower substrate 110 includes a first support substrate 111, first and second gate lines GL1 and GL2, common lines CL, shield lines SL formed at the top of the first support substrate 111 such that the first and second gate lines GL1 and GL2, the common lines CL, and the shield lines SL are disposed in the same layer, a first dielectric layer 112 formed over the entire top of the first support substrate 111 including the first and second gate lines GL1 and GL2, the common lines CL, and the shield lines SL, data lines DL and first and second transistors TFT1 and TFT2 formed at the top of the first dielectric layer 112, a second dielectric layer 113 formed over the entire top of the first dielectric layer 112 including the data lines DL and the first and second transistors TFT1 and TFT2, and first and second pixel electrodes PX and first and second common electrodes CX formed on the second dielectric layer 113. The first and second pixel electrodes PX and the first and second common electrodes CX are made of a transparent conductive material, which may be a metal oxide, such as ITO or ZnO, or a doped metal oxide.

The upper substrate 120 includes a second support substrate and black matrices BM disposed at the rear of the second support substrate to cover the first and second gate lines GL1 and GL2, the common lines CL, the shield lines SL, the data lines DL, and the first and second transistors TFT1 and TFT2 so as to prevent light leakage around the pixel regions.

The liquid crystal display device with the above-stated construction has a double reduced data (DRD) pixel structure in which two neighboring pixels share a data line disposed therebetween. Pixels are divided into first pixels P1 connected to the first gate lines GL1 and second pixels P2 connected to the second gate lines GL2. A first pixel P1 and a second pixel P2 disposed adjacent to each other while a data line DL is disposed therebetween are commonly connected to the data line DL. That is, a ratio of the number of rows, at which the pixels P1 and P2 are disposed, to the number of the gate lines GL is 1:2, and a ratio of the number of columns, at which the pixels P1 and P2 are disposed to the number of the data lines DL is 2:1. In this embodiment, therefore, the liquid crystal display device having the DRD pixel structure has gate driver integrated circuits the number of which is twice that of a conventional liquid crystal display device not having the DRD pixel structure, and data driver integrated circuits the number of which is half that of the conventional liquid crystal display device. Consequently, it is possible to reduce the number of the data driver integrated circuits, which are expensive, thereby reducing manufacturing costs.

The first pixels P1 and the second pixels P2 may be alternately disposed in the first direction as shown in FIG. 3A. Alternatively, the first pixels P1 and the second pixels P2 may be alternately disposed in the second direction or in the first and second directions although not shown.

As shown in FIG. 3A, the distance between a pair consisting of a first gate line GL1 and a second gate line GL2 and another pair consisting of a first gate line GL1 and a second gate line GL2 is defined as a second-direction width of a pixel region. In this embodiment, the gate lines are divided into the first gate lines GL1 connected to the first pixels P1 and the second gate lines GL2 connected to the second pixels P2 for convenience of description. However, the gate driver integrated circuits may sequentially apply a gate signal to the first gate lines GL1 and the second gate lines GL2 irrespective of groups, or sequentially apply a gate signal to the first gate lines GL1 and the second gate lines GL2 by groups.

The data lines DL are shared by the first pixels P1 and the second pixels P2 disposed at opposite sides of the respective date lines DL. The first gate lines GL1 and the data lines DL intersect to define pixel regions of the first pixels P1, and the second gate lines GL2 and the data lines DL intersect to define pixel regions of the second pixels P2.

The common lines CL are disposed alternately with the data lines DL in the second direction. The distance between a data line DL and a common line CL is defined as a first-direction width of a pixel region. The shield lines SL extend from the common lines CL such that the shield lines SL are disposed at opposite sides of the data lines DL in parallel. As shown in FIG. 3A, the common lines CL and the shield lines SL are connected to surround the respective pixel regions in a 'ᄃ'-shape and to surround every two neighboring pixels P1 and P2 in a 90-degree rotated 'ᄅ'-shape.

Also, as shown in FIG. 3B, the shield lines SL are disposed at the opposite sides of the data lines in parallel to minimize malfunction of liquid crystal cells due to electric potential of the data lines DL to which a data signal is applied.

Although not shown in detail in FIG. 3A, each of the first transistors TFT1 or the second transistors TFT2 includes a gate electrode diverging from each of the first gate lines GL1 or the second gate lines GL2, a semiconductor layer formed on the first dielectric layer 112 such that the semiconductor layer partially overlaps the gate electrode, a source electrode formed on the semiconductor layer by diverging from data lines DL such that the source electrode overlaps one side of the gate electrode, and a drain electrode formed on the semiconductor layer such that the drain electrode overlaps the other side of the gate electrode.

As shown in FIG. 3B, the common lines CL and the common electrodes CX are formed at different layers such that the common lines CL and the common electrodes CX are isolated by the first dielectric layer 112 and the second dielectric layer 113. As shown in FIG. 3A, the common lines CL and the common electrodes CX are connected to each other via common electrode contact holes CTcx formed at the first dielectric layer 112 and the second dielectric layer 113 corresponding to partial regions of the common lines CL. In the same manner, the drain electrodes of the first and second transistors TFT1 and TFT2, and the pixel electrodes PX are formed at different layers such that the drain electrodes of the first and second transistors TFT1 and TFT2, and the pixel electrodes PX are isolated by the second dielectric layer 113. The pixel electrodes PX are connected to the drain electrodes of the first and second transistors TFT1 and TFT2 via pixel electrode contact holes CTpx formed at the second dielectric layer 113 corresponding to partial regions of the drain electrodes of the first and second transistors TFT1 and TFT2.

The first and second pixel electrodes PX and the first and second common electrodes CX are formed in the second direction. Further the first and second pixel electrodes PX are disposed around the pixel regions such that the first and second pixel electrodes PX are closer to the pixel regions than the first and second common electrodes CX. As a result, the first and second pixel electrodes PX at least partially overlap with the shield lines SL and the common lines CL in the second direction.

That is, as shown in FIG. 3B, part of a first pixel electrode PX disposed adjacent to a second-direction left corner of a pixel region of a first pixel P1, at least partially overlaps with a corresponding shield line SL in a state in which the first dielectric layer 112 and the second dielectric layer 113 are disposed therebetween. As a result, a first storage capacitor Cst1 is formed at a region where the first pixel electrode PX and the shield line SL overlap in the second direction. The capacitance of the first storage capacitor Cst1 is proportional to the area of the region where the first pixel electrode PX and the shield line SL overlap.

Also, part of a first pixel electrode PX disposed adjacent to a second-direction right corner of the pixel region of the first pixel P1, at least partially overlaps with a corresponding common line CL in a state in which the first dielectric layer 112 and the second dielectric layer 113 are disposed therebetween. As a result, a second storage capacitor Cst2 is formed at a region where the first pixel electrode PX and the common line CL overlap in the second direction. The capacitance of the second storage capacitor Cst2 is proportional to the area of the region where the first pixel electrode PX and the common line CL overlap.

The first storage capacitor Cst1 and the second storage capacitor Cst2 define a total storage capacitor corresponding to the first pixel P1. The total storage capacitor corresponding to the first pixel P1 maintains voltage difference between the pixel electrode PX and the common electrode CX for a predetermined time after the first transistor TFT1 is turned off to stably obtain brightness of the first pixel P1.

In the same manner, part of a second pixel electrode PX disposed adjacent to a second-direction left corner of a pixel region of a second pixel P2, at least partially overlaps with a corresponding common line CL. As a result, a third storage capacitor is formed in the second direction. Also, part of a second pixel electrode PX disposed adjacent to a second-direction right corner of a pixel region of the second pixel P2, at least partially overlaps with a corresponding shield line SL. As a result, a fourth storage capacitor is formed in the second direction. The third storage capacitor and the fourth storage capacitor define a total storage capacitor corresponding to the second pixel P2. The capacitance of the total storage capacitor corresponding to the second pixel P2 is proportional to the sum of the area of the region where the second pixel electrode PX and the common line CL overlap and the area of the region where the second pixel electrode PX and the shield line SL overlap.

If the total storage capacitor of the first pixel P1 and the total storage capacitor of the second pixel P2 have different capacitances, the brightness of each of the pixels is maintained for a different amount of time according to the capacitances of the total storage capacitors, with the result that image quality is reduced. In order to prevent image quality reduction, it is necessary for all of the pixels, particularly neighboring pixels, to be provided with total storage capacitances of the pixels having the same capacitance.

As previously described, the first and second pixel electrodes PX and the first and second common electrodes CX are formed on the second dielectric layer 113 using a transparent conductive material. That is, the first and second pixel electrodes PX and the first and second common electrodes CX are formed by depositing a transparent conductive material on the second dielectric layer 113 and patterning the deposited transparent conductive material through exposure using a mask. When the mask is correctly aligned, the capacitances of the storage capacitors formed at second-direction opposite corners of the pixel region in the second direction are occurred as designed, as shown in FIG. 3B.

In this embodiment, a total storage capacitor corresponding to each pixel is defined as the sum of the storage capacitors Cst1 and Cst2 formed at the second-direction opposite corners of the pixel region. Consequently, although the mask used to expose the transparent conductive material is biased to one side in the first direction, i.e., an alignment error occurs, capacitances of the storage capacitors corresponding to the respective pixels may be uniformly maintained.

That is, when the mask used to expose the transparent conductive material is biased to one side in the first direction, i.e., an alignment error occurs, the areas of the regions where the first pixel electrodes PX and the shield lines SL overlap are decreased due to the alignment error of the mask, with the result that capacitances of the first storage capacitors Cst1 are decreased, whereas the areas of the regions where the first pixel electrodes PX and the common lines CL overlap are increased due to the alignment error of the mask, with the result that capacitances of the second storage capacitors Cst2 are increased, as can be seen from comparison between FIGS. 3B and 4A. Consequently, the sum total of the capacitances of the first storage capacitors Cst1 and the second storage capacitors Cst2 remains the same.

In the same manner, when the mask used to expose the transparent conductive material is biased to the other side in the first direction, i.e., an alignment error occurs, the areas of the regions where the first pixel electrodes PX and the shield lines SL overlap are increased due to the alignment error of the mask, with the result that capacitances of the first storage capacitors Cst1 are increased, whereas the areas of the regions where the first pixel electrodes PX and the common lines CL overlap are decreased due to the alignment error of the mask, with the result that capacitances of the second storage capacitors Cst2 are decreased, as can be seen from comparison between FIGS. 3B and 4B. That is, the capacitances of the first storage capacitors Cst1 are increased, and the capacitances of the second storage capacitors Cst2 are decreased, due to the alignment error of the mask. Consequently, the sum total of the capacitances of the first storage capacitors Cst1 and the second storage capacitors Cst2 remains the same.

In this embodiment, therefore, the capacitances of the storage capacitors corresponding to the first pixels P1 defined as the sum total of the capacitances of the first storage capacitors Cst1 and the second storage capacitors Cst2 are uniformly maintained irrespective of the alignment error of the mask. Consequently, the respective pixels are prevented from having storage capacitors of different capacitances due to alignment error of the mask, thereby preventing reduction in image quality.

In this embodiment, on the other hand, the black matrices BM above the data lines DL are formed to have a sufficiently large width to cover all of the data lines DL and the shield lines SL so as to prevent light leakage between the data lines DL and the shield lines SL due to an electric field, as shown in FIG. 3B. The first storage capacitors Cst1 are formed using parts of the shield lines SL disposed adjacent to the data lines DL as lower electrodes. That is, the first storage capacitors Cst1 are formed using regions around the pixel regions covered by the black matrices BM above the data lines DL, thereby preventing additional reduction of an aperture ratio due to the first storage capacitors Cst1.

In the liquid crystal display device having the DRD pixel structure, the black matrices BM above the common lines CL are formed to have a width similar to the black matrices BM above the data lines DL so as to prevent a visibility problem in which the black matrices above the data lines are more visible than the black matrices above the common lines. In this embodiment, the second storage capacitors Cst2 are formed using parts of the common lines DL as lower electrodes. Consequently, regions around the pixel regions covered by the black matrices BM above the common lines CL are utilized, thereby preventing additional reduction of an aperture ratio due to the second storage capacitors Cst2.

Figure 1:
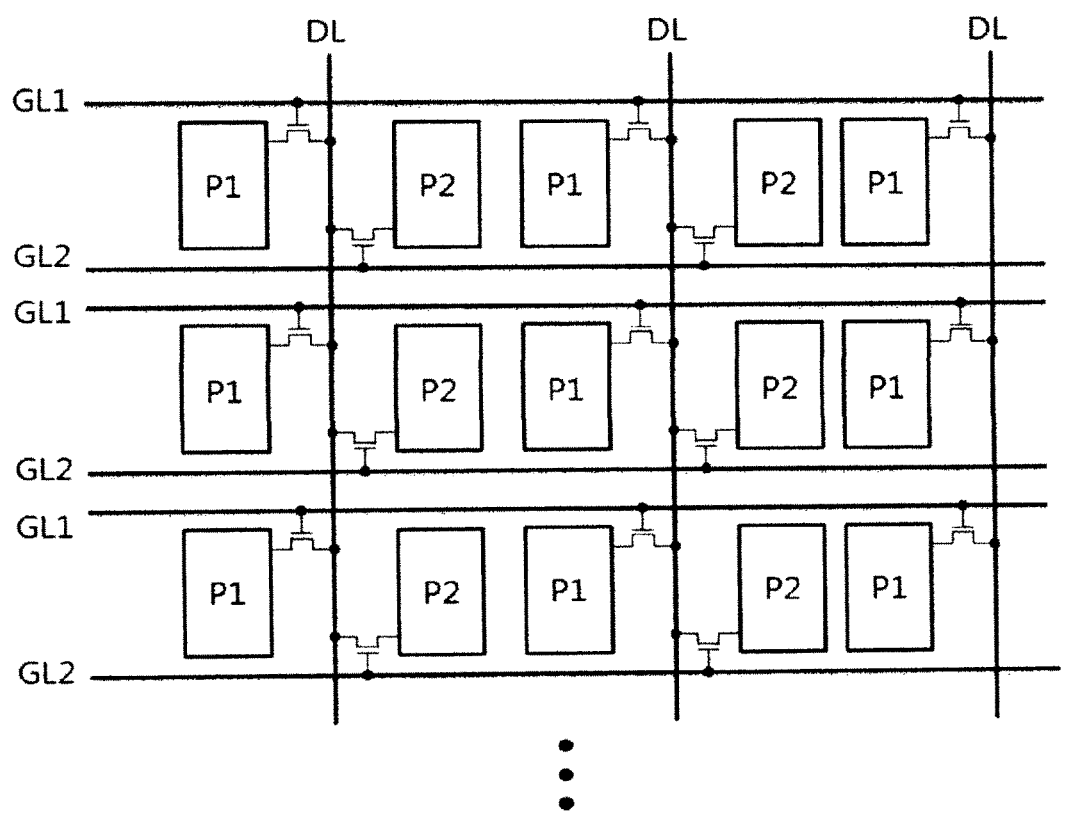
FIG. 1 is an equivalent circuit diagram of a general liquid crystal display device having a double reduced data (DRD) pixel structure.
Figure 2A:
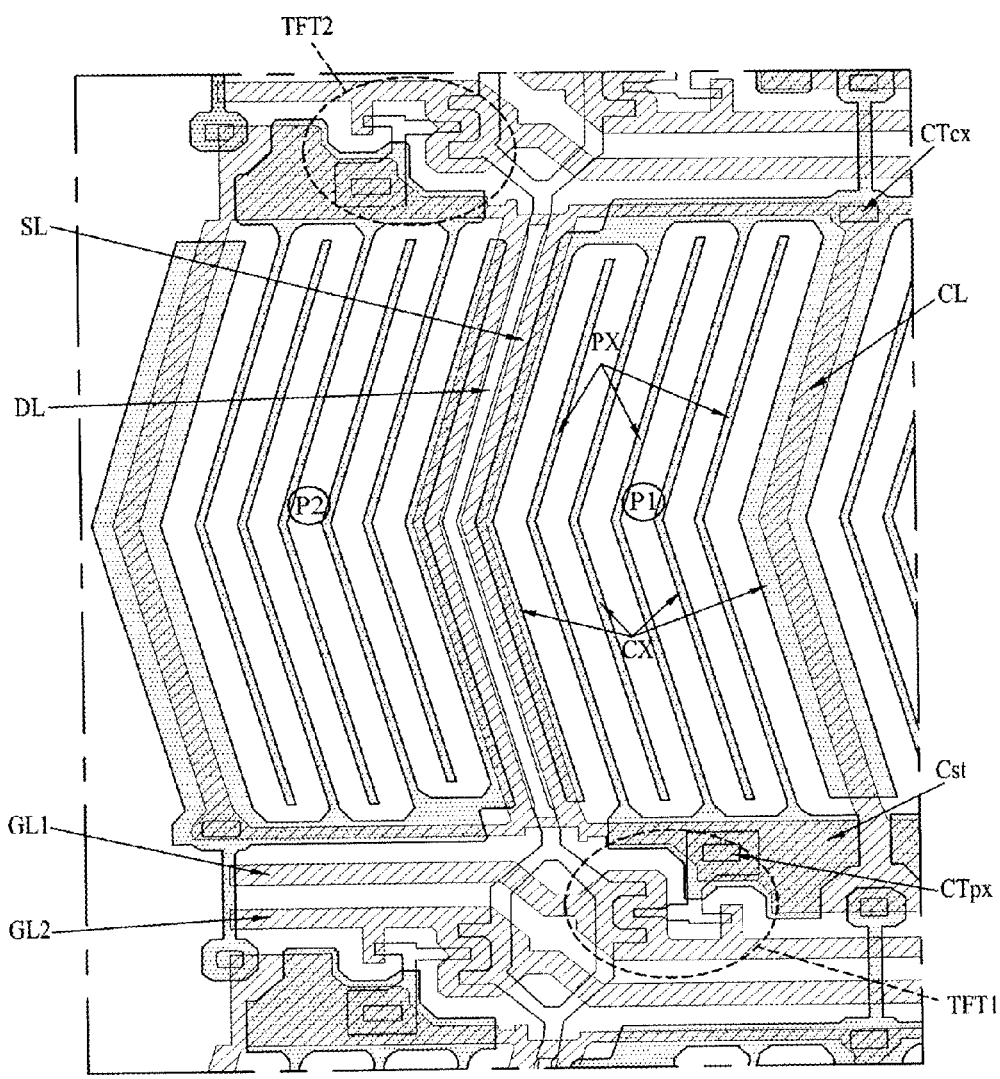
FIG. 2A is a plan view illustrating a conventional liquid crystal display device having a DRD pixel structure.
Figure 2B:
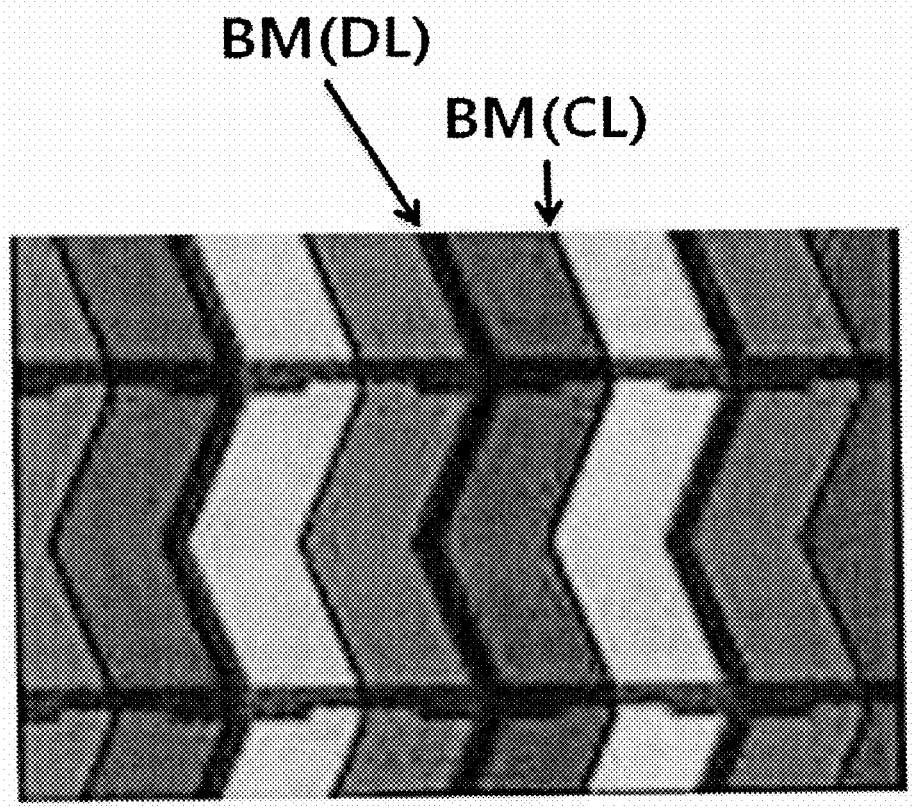
FIG. 2B is an image illustrating a light discharge surface of the liquid crystal display device shown in FIG. 2A.

As described above, the first and second storage capacitors Cst1 and Cst2 are formed around the pixel regions. In this case, the aperture ratio of the liquid crystal display device of this embodiment is appropriately 10% higher than that of the conventional liquid crystal display device shown in FIG. 2A.

In the liquid crystal display device of this embodiment, the pixels adjacent to each other while the data lines DL are disposed therebetween share the data lines DL therebetween. Consequently, it is possible to reduce the number of the data driver integrated circuits connected to the respective data lines DL, thereby reducing manufacturing costs.

Also, in the liquid crystal display device of this embodiment, the pixel electrodes PX are formed around the pixel regions such that the pixel electrodes PX are adjacent to the pixel regions, and therefore, the pixel electrodes PX at least partially overlap with the shield lines SL to prevent malfunction due to electric potential of the data lines DL and with the common lines CL. Consequently, the first and second storage capacitors Cst1 and Cst2 are formed at the regions where the pixel electrodes PX and the shield lines SL overlap and at the regions where the pixel electrodes PX and the common lines CL overlap, respectively. That is, the total storage capacitors corresponding to the respective pixels are defined as the sum of the first and second storage capacitors Cst1 and Cst2 formed around the pixel regions at opposite sides of the pixel regions. The capacitances of the storage capacitors corresponding to the respective pixels are maintained irrespective of the alignment error of the mask, thereby preventing reduction in image quality due to capacitance difference between the storage capacitors corresponding to the respective pixel.

Also, as previously described, the black matrices BM above the data lines DL are formed to have a sufficiently large width to cover all of the data lines DL and the shield lines SL so as to prevent light leakage between the data lines DL and the shield lines SL, and the black matrices BM above the common lines CL are formed to have a width similar to the black matrices BM above the data lines DL so as to prevent a visibility problem in which the black matrices above the data lines DL are more visible than the black matrices above the common lines CL. In this case, the storage capacitors Cst1 and Cst2 are formed around the pixel regions covered by the black matrices BM above the data lines DL and the black matrices above the common lines CL. That is, the storage capacitors Cst1 and Cst2 are not assigned to parts of the pixel regions but regions around the pixel regions. Consequently, the reduction of the aperture ratio due to the storage capacitors is minimized, thereby improving image quality.

As is apparent from the above description, a liquid crystal display device according to an embodiment of the present invention includes pixel electrodes formed around pixel regions such that the pixel electrodes are adjacent to the pixel regions, the pixel electrodes at least partially overlapping with shield lines to prevent malfunction due to electric potential of data lines and with common lines and storage capacitors formed at regions where the shield lines and the pixel electrodes overlap and at regions where the common lines and the pixel electrodes overlap. Since the storage capacitors are formed at opposite sides of the respective pixel regions, capacitances are maintained even if mask alignment error occurs during pixel electrode formation. Consequently, it is possible to prevent image quality reduction due to capacitance difference between the storage capacitors corresponding to respective pixels.

Also, the storage capacitors are not formed in the pixel regions but are formed at regions around the pixel regions covered by black matrices above the data lines and at regions around the pixel regions covered by black matrices above the common lines which must be formed to have a width similar to the black matrices above the data lines so as to solve a visibility problem. Consequently, aperture ratio reduction due to the storage capacitors is minimized, thereby improving image quality.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A liquid crystal display device comprising:
a lower substrate,
an upper substrate disposed opposite to the lower substrate, and
a liquid crystal layer filling a space defined between the lower substrate and the upper substrate,
wherein said lower substrate includes:
first gate lines and second gate lines alternately formed in a first direction such that the first gate lines and the second gate lines are insulated from each other;
data lines formed in a second direction perpendicular to the first direction such that the data lines intersect the first gate lines and the second gate lines;
common lines formed alternately with the data lines in the second direction;
shield lines extending from the common lines such that the shield lines are disposed adjacent to opposite sides of the data lines in parallel;
first transistors formed at regions where the first gate lines and the data lines intersect;

first pixel electrodes formed at pixel regions of first pixels defined by intersection between the first gate lines and the data lines, the first pixel electrodes being connected to the first transistors, the first pixel electrodes at least partially overlapping with the common lines and the shield lines respectively in the second direction around the pixel regions of the first pixels; and first common electrodes formed alternately with the first pixel electrodes at the pixel regions of the first pixels, the first common electrodes being connected to the common lines.

2. The liquid crystal display device of claim 1, said lower substrate further includes second pixels defined by intersection between the second gate lines and the data lines, and wherein the first pixels and second pixels disposed adjacent to each other a data line being disposed therebetween are commonly connected to the data line.

3. The liquid crystal display device of claim 1, wherein said the common lines and the shield lines are connected to surround the respective pixel regions in a 'ㄷ'-shape and to surround every two neighboring pixels in a 90-degree rotated 'ㄹ'-shape.

4. The liquid crystal display device of claim 1, said lower substrate further includes:

first storage capacitors formed at regions where shield lines and the first pixel electrodes overlap in the second direction, and second storage capacitors formed at regions where the common lines and the first pixel electrodes overlap in the second direction, wherein the sum of the first storage capacitors and the second storage capacitors defines a total storage capacitor corresponding to respective pixels.

5. The liquid crystal display device of claim 4, wherein total storage capacitors of all of the pixels have the same capacitance.

6. The liquid crystal display device of claim 4, said upper substrate includes:

black matrices disposed at the rear of the upper substrate to cover the common lines, the shield lines, and the data lines so as to prevent additional reduction of an aperture ratio due to the first and second storage capacitors.

7. The liquid crystal display device of claim 6, wherein the black matrices above the common lines is formed to have a width similar to the black matrices above the data lines.

\* \* \* \* \*